United States Patent
Shin et al.

(12)

(10) Patent No.: US 12,027,703 B1
(45) Date of Patent: Jul. 2, 2024

(54) ELECTRODE ACTIVE COMPOSITE

(71) Applicant: Rivian IP Holdings, LLC, Irvine, CA (US)

(72) Inventors: Woochul Shin, Newark, CA (US); Soo Kim, Fremont, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/447,255

(22) Filed: Aug. 9, 2023

(51) Int. Cl.
| | | |
|---|---|---|
| *H01M 4/58* | (2010.01) | |
| *H01M 4/04* | (2006.01) | |
| *H01M 4/36* | (2006.01) | |
| *H01M 4/505* | (2010.01) | |
| *H01M 4/525* | (2010.01) | |
| *H01M 4/02* | (2006.01) | |

(52) U.S. Cl.
CPC ....... *H01M 4/5825* (2013.01); *H01M 4/0404* (2013.01); *H01M 4/362* (2013.01); *H01M 4/505* (2013.01); *H01M 4/525* (2013.01); *H01M 2004/028* (2013.01); *H01M 2220/20* (2013.01)

(58) Field of Classification Search
CPC ...... H01M 4/58; H01M 4/5825; H01M 4/362; H01M 4/364; H01M 4/366; H01M 4/505; H01M 4/525
See application file for complete search history.

(56) References Cited

U.S. PATENT DOCUMENTS

| | | | |
|---|---|---|---|
| 2011/0143204 A1* | 6/2011 | Paik | H01M 10/4235 429/223 |
| 2012/0231241 A1 | 9/2012 | Kim et al. | |
| 2016/0149205 A1* | 5/2016 | Theivanayagam | H01M 4/0435 429/221 |
| 2023/0170477 A1 | 6/2023 | Kim et al. | |

FOREIGN PATENT DOCUMENTS

| WO | WO2013052494 | * | 4/2013 |
|---|---|---|---|
| WO | WO2022106221 | * | 5/2022 |

OTHER PUBLICATIONS

WO2022106221 English translation. Buchholz et al. Wipo. May 27, 2022. (Year: 2022).*
Sharifi-Asl et al., "Oxygen Release Degradation in Li-Ion Battery Cathode Materials: Mechanisms and Mitigating Approaches," Apr. 2019, retrieved from https://www.osti.gov/servlets/purl/1526722, 37 pages.

* cited by examiner

*Primary Examiner* — Christopher P Domone
(74) *Attorney, Agent, or Firm* — BAKERHOSTETLER

(57) ABSTRACT

Aspects of the disclosure relate to electrode active composites for use in battery cells that include a cathode active material including oxygen and an oxygen scavenging oxide. The cathode active material can be a blend of a lithium metal phosphate and an over-lithiated oxide. Advantageously, the blend of a lithium metal phosphate and over-lithiated oxide can have a higher energy density relative to the lithium metal phosphate alone and the oxygen scavenging oxide can improve the stability of the active composite.

13 Claims, 13 Drawing Sheets

ELECTRODE ACTIVE COMPOSITE

INTRODUCTION

The present disclosure generally relates to electrode active composites for use in battery cells. Battery cells are often used to store and discharge electrical energy.

Aspects of the subject technology can help improve the operation and implementation of battery cells. For example, battery cells having electrode active composites of the present disclosure can increase energy density and utilization of batteries. Batteries with increased energy density can help to mitigate climate change by reducing and/or preventing additional greenhouse gas emissions.

SUMMARY

The present disclosure generally relates to electrode active materials, e.g., cathode active materials, that include oxygen and an oxygen scavenger oxide. The oxygen scavenger oxide can advantageously reduce oxygen evolution of the electrode active material. Such oxygen scavengers can also be used with a wide variety of cathode active materials that have a propensity for oxygen evolution. Such cathode materials include, for example, (1) a layered lithium oxide; (2) a spinel lithium oxide; (3) an olivine lithium metal phosphate (LMP); (4) an over-lithiated oxide (OLO), or a blend of two or more thereof.

In some aspects, the oxygen scavenging oxide is selected among: a cerium oxide, boron oxide, titanium oxide, niobium oxide, tin oxide, vanadium oxide, manganese oxide, iron oxide, copper oxide, molybdenum oxide, antimony oxide, or a combination thereof. The oxygen scavenging oxide can be in a weight ratio of from about 99.9:0.1 to about 95:5 relative to the cathode active material, e.g., relative to a blend of LMP and OLO.

In accordance with one or more implementation of the present disclosure, LMP can include $LiFe_{1-x}M_x PO_4$, in which $0 \leq x \leq 1$ and M includes manganese (Mn), nickel (Ni), Aluminum (Al), cobalt (Co), magnesium (Mg), zinc (Zn), titanium (Ti), or a combination of two or more thereof. In other implementations, the OLO can have a formula of $Li_{1+y}M_{1-y}O_2$, wherein $0<y<1$ and M is Ni, Mn, Co, Al, Mg, Cr, Fe, Ti, Zr, Mo, or a combination thereof. In some aspects, the OLO has less than 5 mole % of cobalt. In other aspects, the OLO has less than 5 mole % of cobalt and more than 55 mole % Mn. In still further aspects, the OLO has from about 30-90 mol % Ni and from about 70-10 mole % Mn.

In accordance with one or more implementations, a cathode can include active composites of the present disclosure. For example, a cathode can include a blend of a lithium metal phosphate (LMP); and an over-lithiated oxide (OLO), which includes an excess stoichiometric mole amount of lithium in a lithium metal oxide. The blend can have a ratio of from about 70:30 to about 99:1. In other aspects, an average particle size of the LMP is less than an average particle size of the OLO. Further, in other aspects, an LMP/OLO blend can have a higher specific energy relative to LFP alone such as a 10% higher, 20% higher and over 30% higher specific energy relative to LFP alone.

In one or more implementations, a battery cell can have an active composite as described herein. For example, the battery cell can include a cathode, which comprises a blend of a lithium metal phosphate (LMP), an over-lithiated oxide (OLO), and an oxygen scavenging oxide. Such a battery cell having an active composite as described herein can be included in a building and/or movable apparatus, e.g., a vehicle. For example, such a battery cell may be configured to power a component or system of a building and/or a vehicle.

BRIEF DESCRIPTION OF THE DRAWINGS

Certain features of the subject technology are set forth in the appended claims. However, for purpose of explanation, several embodiments of the subject technology are set forth in the following figures.

FIG. 4A is a graph comparing charge and discharge results for battery cells with cathodes including either lithium iron phosphate (LFP) or lithium (manganese) iron phosphate (LMFP). FIG. 4B is a graph comparing charge and discharge results for battery cells with cathodes including either LMFP or a composite blend of LFP and over-lithiated oxide (OLO) prepared according to Example 1.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Figure 1A:
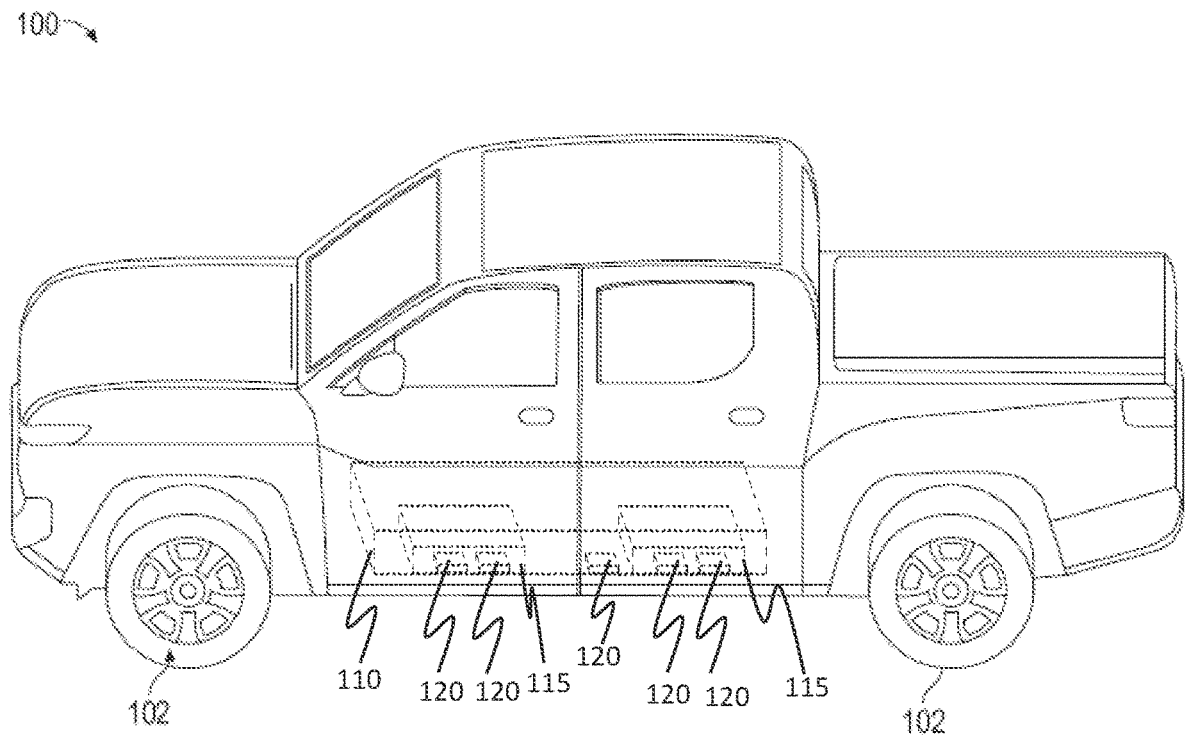
FIGS. 1A and 1B illustrate schematic perspective side views of example implementations of a vehicle having a battery pack in accordance with one or more implementations.

As discussed in further detail hereinafter, a battery cell composed of an electrode including an active composite of the present disclosure may be used to store and discharge electrical energy. A battery cell of the present disclosure can be used alone or multiple battery cells can be assembled or packaged together in the same housing, frame, or casing to form a battery subassembly, module and/or battery pack. Further, multiple battery subassemblies or modules can be assembled or packaged together to form a battery pack. The battery cells of a battery subassembly, module and/or pack can be electrically connected to generate a desired voltage output for the battery subassembly, module and/or pack. The battery subassembly, module and/or pack in turn can be electrically connected to a power-consuming component, such as a vehicle and/or an electrical system of a building. Vehicles, Battery Packs, Cells FIG. 1A is a diagram illustrating an example implementation of a movable apparatus as described herein. In the example of FIG. 1A, a movable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically-powered engines, such as a gas-powered engine or a fuel cell powered motor. For example, electric vehicles can be fully electric or partially electric (e.g., hybrid or plug-in hybrid). In various implementations, the vehicle 100 may be a fully autonomous vehicle that can navigate roadways without a human operator or driver, a partially autonomous vehicle that can navigate some roadways without a human operator or driver or that can navigate roadways with the supervision of a human operator, may be an unmanned vehicle that can navigate roadways or other pathways without any human occupants, or may be a human operated (non-autonomous) vehicle configured for a human operator.

In the example of FIG. 1A, the vehicle 100 is implemented as a truck (e.g., a pickup truck) having a battery pack 110. As shown, the battery pack 110 may include one or more battery subassemblies (e.g., modules) 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery unit (e.g., a subassembly or module) can include an assembly of cells that can be combined with other elements (e.g., structural frame, thermal management devices) that can protect the assembly of cells from heat, shock and/or vibrations.

For example, the battery cell 120 can be included a battery, a battery unit, a battery subassembly, module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100.

Figure 1B:
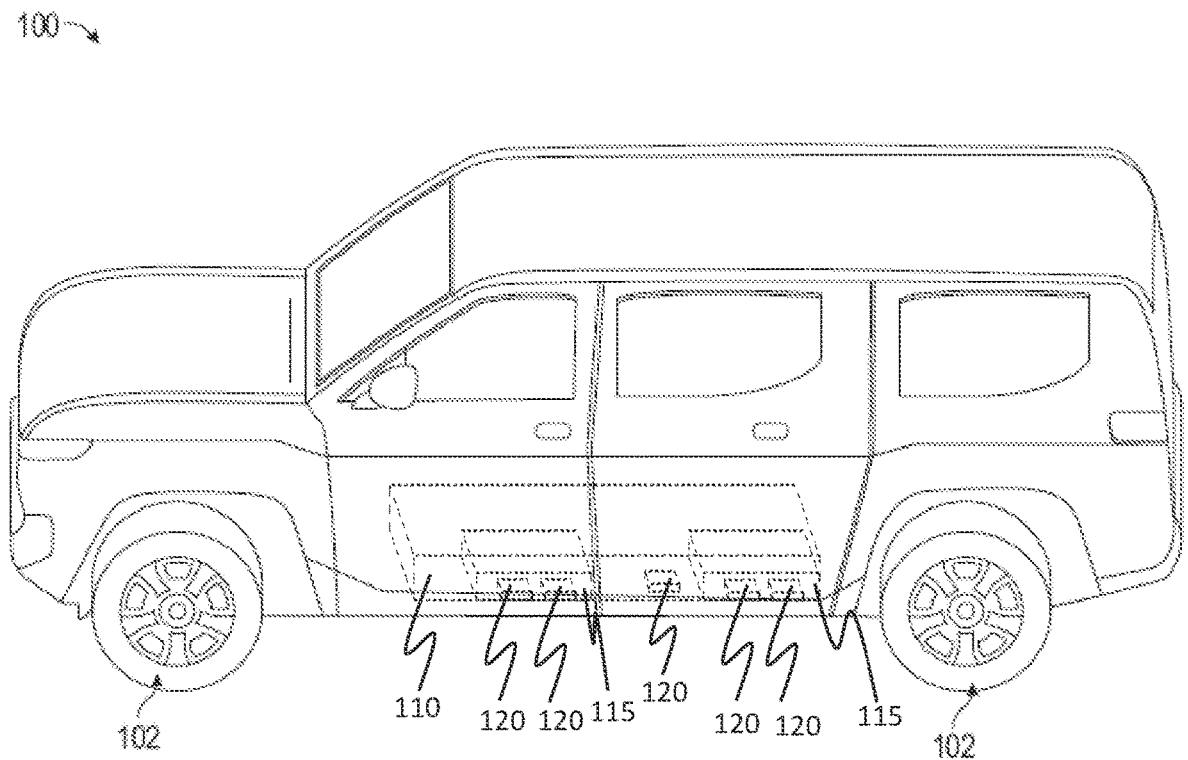

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the movable apparatus).

Figure 1C:
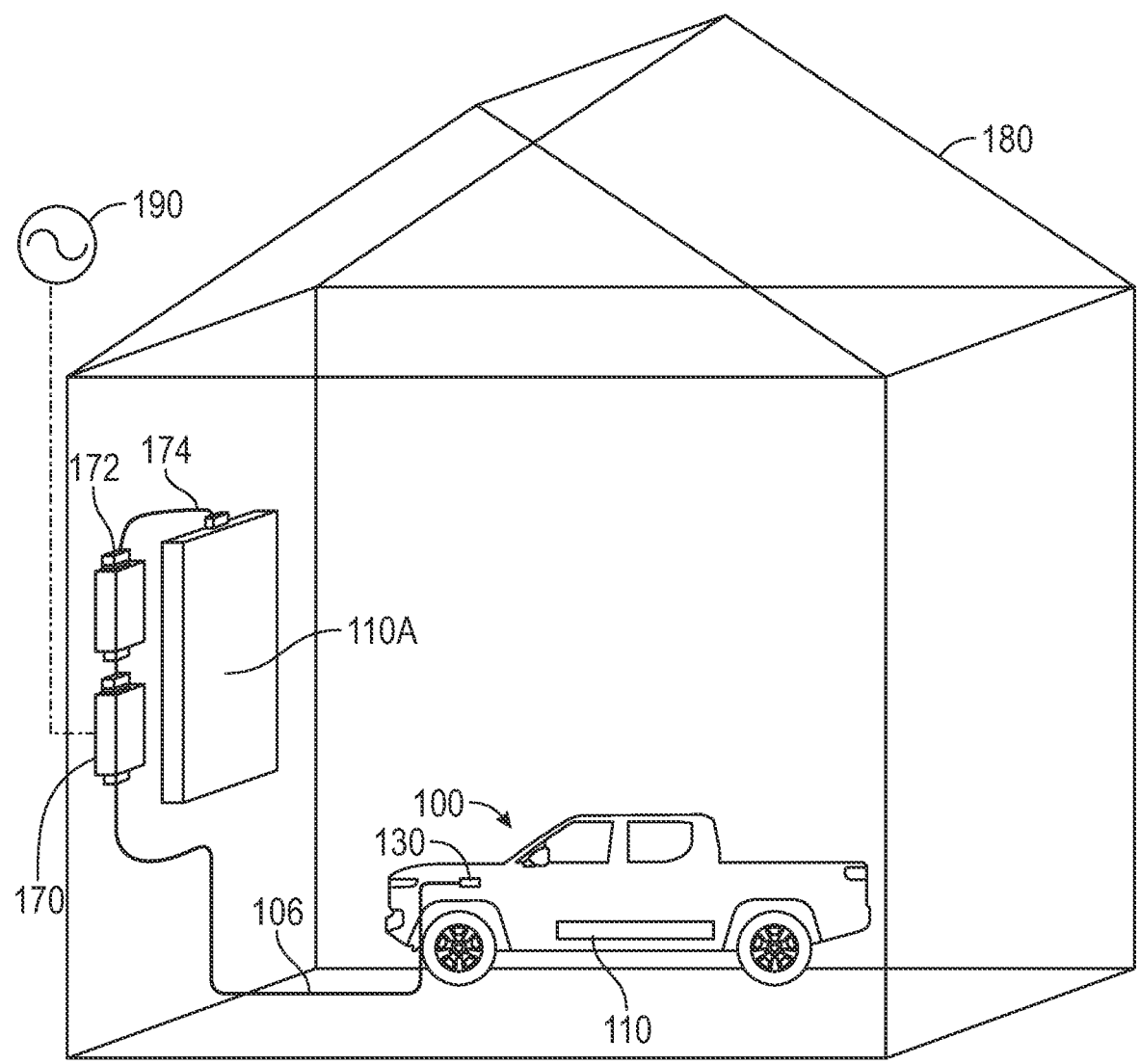
FIG. 1C illustrates a schematic perspective view of a building having a battery pack in accordance with one or more implementations.

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
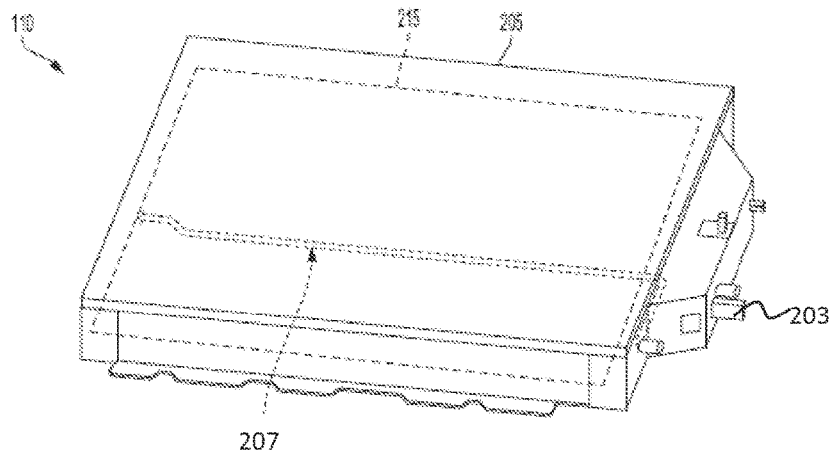
FIG. 2A illustrates a schematic perspective view of a battery pack in accordance with one or more implementations.

FIG. 2A depicts an example battery pack 110. Battery pack 110 may include multiple battery cells 120 (e.g., directly installed within the battery pack 110, or within batteries, battery units, and/or battery subassemblies) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within the battery pack frame 205 to generate a desired output voltage for the battery pack 110. The battery pack 110 may also include one or more external connection ports, such as an electrical contact 203 (e.g., a high voltage terminal). For example, an electrical cable (e.g., cable/connector 106) may be connected between the electrical contact 203 and an electrical system of the vehicle 100 or the building 180, to provide electrical power to the vehicle 100 or the building 180.

As shown, the battery pack 110 may include a battery pack frame 205 (e.g., a battery pack housing or pack frame). For example, the battery pack frame 205 may house or enclose one or more battery modules 115 and/or one or more battery cells 120, and/or other battery pack components. In one or more implementations, the battery pack frame 205 may include or form a shielding structure on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules 115, battery units, batteries, and/or battery cells 120 within the battery pack frame 205, such as by distributing fluid through the battery pack 110.

For example, the thermal control structures 207 may form a part of a thermal/temperature control or heat exchange system that includes one or more thermal components 215 such as plates or bladders that are disposed in thermal contact with one or more battery modules 115 and/or battery cells 120 disposed within the battery pack frame 205. For example, a thermal component 215 may be positioned in contact with one or more battery modules 115, battery units, batteries, and/or battery cells 120 within the battery pack frame 205. In one or more implementations, the battery pack 110 may include one or multiple thermal control structures 207 and/or other thermal components for each of several top and bottom battery module pairs. As shown, the battery pack 110 may include an electrical contact 203 (e.g., a high voltage connector) by which an external load (e.g., the vehicle 100 or an electrical system of the building 180) may be electrically coupled to the battery modules and/or battery cells in the battery pack 110.

Figure 2B:
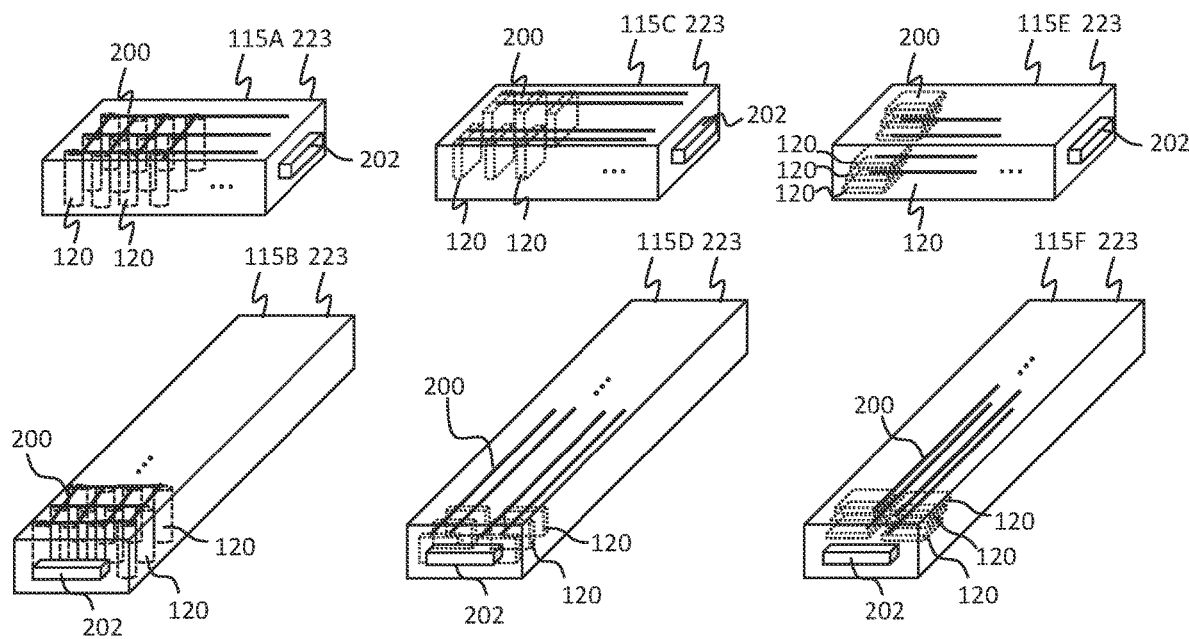
FIG. 2B illustrates schematic perspective views of various battery modules that may be included in a battery pack in accordance with one or more implementations.

FIG. 2B depicts various examples of battery subassemblies (e.g. modules 115) that may be disposed in the battery pack 110 (e.g., within the battery pack frame 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the battery pack frame 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the battery pack frame 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the battery pack frame 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation).

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the battery pack frame 205) may include or define a plurality of structures for positioning of the battery cells 120 directly within the battery pack frame 205.

Figure 2C:
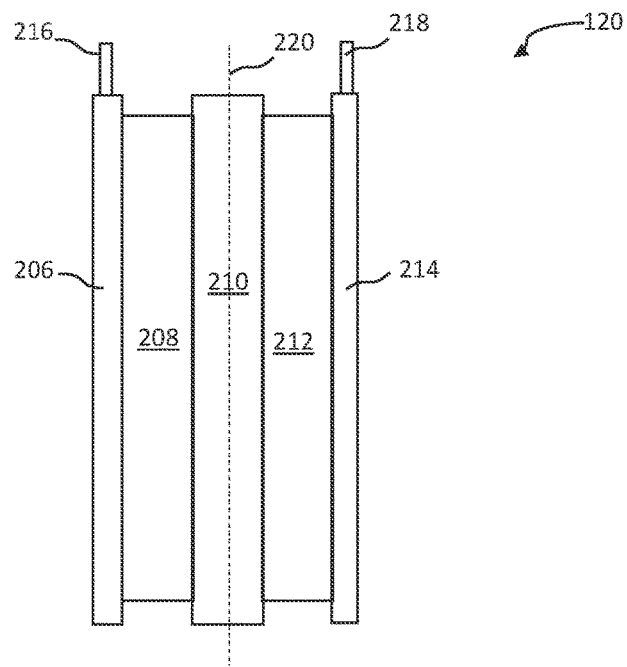
FIG. 2C illustrates a cross-sectional end view of a battery cell in accordance with one or more implementations.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). As shown, the cathode 212 may include or be electrically coupled to a second current collector 214 (e.g., a metal layer such as a layer of aluminum foil or other metal foil). As shown, the battery cell 120 may include a first terminal 216 (e.g., a negative terminal) coupled to the anode 208 (e.g., via the first current collector 206) and a second terminal 218 (e.g., a positive terminal) coupled to the cathode (e.g., via the second current collector 214). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. The cathode 212 can include an active composite composed of a cathode active material including oxygen (e.g., a LMP/OLO blend) and an oxygen scavenging oxide. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Figure 2D:
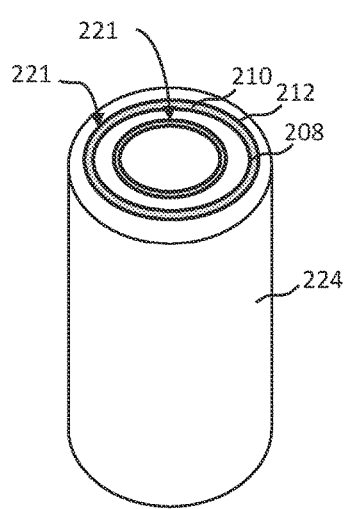
FIG. 2D illustrates a cross-sectional perspective view of a cylindrical battery cell in accordance with one or more implementations.

In various implementations, the anode 208, the electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 224 having a cylindrical outer shape. For example, the anode 208, the electrolyte 210, and the cathode 212 may be rolled into one or more substantially cylindrical windings 221. As shown, one or more windings 221 of the anode 208, the electrolyte 210, and the cathode 212 (e.g., and/or one or more separator layers such as separator layer 220) may be disposed within the cell housing 224. For example, a separator layer may be disposed between adjacent ones of the windings 221. However, the cylindrical cell implementation of FIG. 2D is merely illustrative, and other implementations of the battery cells 120 are contemplated.

Figure 2E:
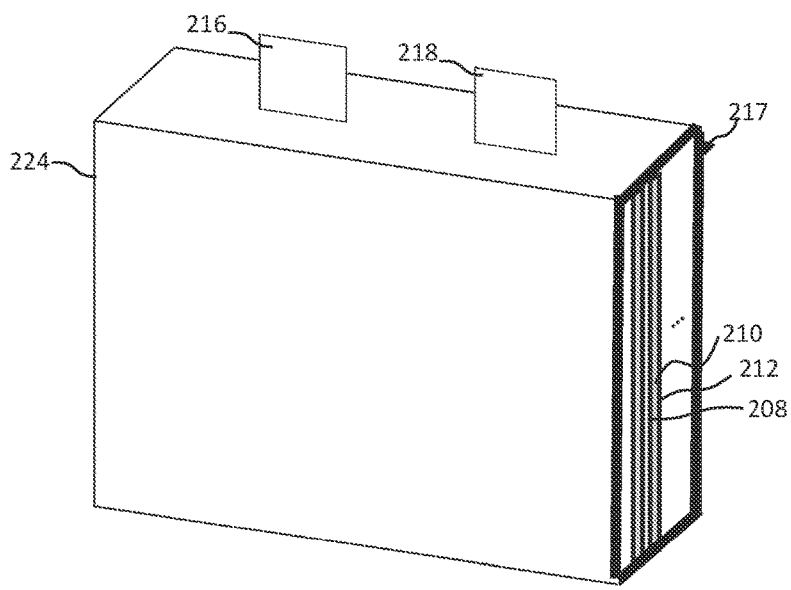
FIG. 2E illustrates a cross-sectional perspective view of a prismatic battery cell in accordance with one or more implementations.

For example, FIG. 2E illustrates an example in which the battery cell 120 is implemented as a prismatic cell. As shown in FIG. 2E, the battery cell 120 may have a cell housing 224 having a right prismatic outer shape. As shown, one or more layers of the anode 208, the cathode 212, and the electrolyte 210 disposed therebetween may be disposed (e.g., with separator materials between the layers) within the cell housing 224 having the right prismatic shape. As examples, multiple layer of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 224 having the right prismatic shape. In the implementation of FIG. 2E, the cell housing 224 has a relatively thick cross-sectional width 217 and is formed from a rigid material. For example, the cell housing 224 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 224 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 224 (e.g., a glass to metal feedthrough) as the conductor passes through to the cell housing 224 to expose the first terminal 216 and the second terminal 218 outside the cell housing 224 (e.g., for contact with an interconnect structure 200 of FIG. 2B). However, this implementation of FIG. 2E is also illustrative and yet other implementations of the battery cell 120 are contemplated.

Figure 2F:
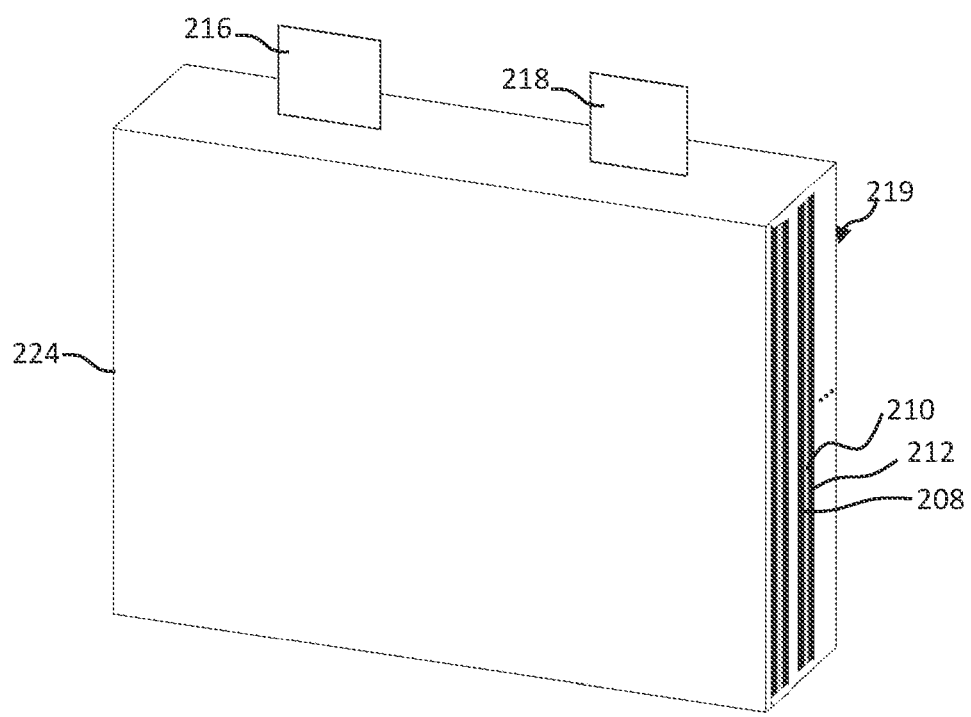
FIG. 2F illustrates a cross-sectional perspective view of a pouch battery cell in accordance with one or more implementations.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed (e.g., with separator materials between the layers) within the cell housing 224 that forms a flexible or malleable pouch housing. In the implementation of FIG. 2F, the cell housing 224 has a relatively thin cross-sectional width 219. For example, the cell housing 224 in the implementation of FIG. 2F may be formed from a flexible or malleable material (e.g., a foil, such as a metal foil, or film, such as an aluminum-coated plastic film). For example, the cross-sectional width 219 of the cell housing 224 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 224 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 224 of the battery cell 120 can be disposed in the battery module 115, the battery pack 110, or installed in any of the vehicle 100, the building 180, or any other electrically powered component or device.

Active Composites

As discussed above, a battery cell (e.g., battery cell 120) composed of an electrode (e.g., cathode 212) including an active composite of the present disclosure can be used to store and discharge electrical energy and implemented in a building and/or movable apparatus.

Aspects of the active composite of the present disclosure employ lithium metal oxides and/or phosphates. Lithium metal phosphates (LMP), such as lithium iron phosphate (LFP), find use as cathode active materials in battery cells due to their relatively low costs and high cycle life. However, LMP active materials when used alone disadvantageously have relatively low energy density. Further, certain lithium metal oxides, such as over-lithiated metal oxides, while having higher energy density can undergo decomposition at certain voltages to release oxygen gas.

Aspects of the subject technology described herein relate to electrode active composites, e.g., cathode active composites, that include a cathode active material including oxygen and an oxygen scavenging oxide. The active composites can include cathode active materials, such as blends of a lithium metal phosphate (LMP) with an over-lithiated oxide (OLO), and the oxygen scavenging oxide.

Generally, the cathode active materials of the present disclosure include lithium metal oxides, lithium metal phosphates, over-lithiated oxides, or combinations thereof. Such materials include oxygen in their structure and allow shuttling of lithium ions during operation of a battery cell. The cathode active material including oxygen can be selected among: (1) a layered lithium metal oxide, e.g., $LiMO_2$ (M is a metal cation such as Ni, Mn, Co, Fe, Al, Mg, Cr, Ti, Zr, Mo, etc. or a combination thereof); (2) a spinel lithium metal oxide, e.g., $LiM_2O_4$ (M is a metal cation as defined above); (3) an olivine lithium metal phosphate; (4) an over-lithiated oxide; or a combination of two or more thereof.

Battery electrodes including lithium metal oxides, however, can release oxygen via decomposition of cathode active materials or through degradation of cell components. Oxygen evolution from a battery cell is a complex mechanism that can be influenced by many parameters including, for example, composition, applied voltage, surface morphology, etc. To ameliorate oxygen release from the cell, an oxygen scavenging oxide can be included with the cathode active material including oxygen. Advantageously, the oxygen scavenging oxide of the present disclosure has sufficient ionic conductivity that allows $Li^+$ ion transport such that the addition of such a scavenging oxide does not significantly interfere with the operation of the battery cell. Adding small amount of the oxygen scavenging oxide of the present disclosure does not have a significant influence on increasing the cell resistance from $Li^+$ and/or $e^-$ transports. Such an oxygen scavenging oxide can be selected among, without limitation: a cerium oxide, boron oxide, titanium oxide, niobium oxide, tin oxide, vanadium oxide, manganese oxide, iron oxide, copper oxide, molybdenum oxide, antimony oxide, or a combination thereof.

Table 1 below provides a list of oxygen scavenging oxides that can be included with cathode active materials according to implementations of the present disclosure.

TABLE 1

Listing of oxygen scavenging oxides

| Reaction | $E_{rxx}$ (eV/atom) |
|---|---|
| $0.5\ Ce_2O_3 + 0.25\ O_2 \rightarrow CeO_2$ | −0.786 |
| $0.111\ B_6O + 0.4445\ O_2 \rightarrow 0.333\ B_2O_3$ | −2.422 |
| $0.5\ TiO + 0.25\ O_2 \rightarrow 0.5\ TiO_2$ | −1.563 |
| $0.4\ NbO + 0.3\ O_2 \rightarrow 0.2\ Nb_2O_5$ | −1.728 |
| $0.5\ SnO + 0.25\ O_2 \rightarrow 0.5\ SnO_2$ | −1.021 |
| $0.333\ V_2O_3 + 0.3335\ O_2 \rightarrow 0.333\ V_2O_5$ | −0.485 |
| $0.5\ MnO + 0.25\ O_2 \rightarrow 0.5\ MnO_2$ | −0.486 |
| $0.667\ FeO + 0.1665\ O_2 \rightarrow 0.333\ Fe_2O_3$ | −0.522 |
| $0.5\ Cu_2O + 0.25\ O_2 \rightarrow CuO$ | −0.459 |
| $0.667\ NbO_2 + 0.1665\ O_2 \rightarrow 0.333\ Nb_2O_5$ | −0.551 |
| $0.5\ MoO_2 + 0.25\ O_2 \rightarrow 0.5\ MoO_3$ | −0.412 |
| $0.3335\ O_2 + 0.333\ Sb_2O_3 \rightarrow 0.333\ Sb_2O_5$ | −0.497 |

As provided in Table 1 above, particular oxygen scavenging oxides can be selected among: $Ce_2O_3$, $B_6O$, TiO, NbO, $NbO_2$, SnO, $V_2O_3$, MnO, FeO, $Cu_2O$, $MoO_2$, $Sb_2O_3$, or a combination thereof. Table 1 above further shows the reaction of the scavenging oxide with oxygen and eV/atom energy associated with the proposed reaction. Among the oxygen scavenging oxides, $Ce_2O_3$ is listed first in the table as it is used in fuel cells. However, and as shown in Table 1, $B_6O$, TiO, NbO, $NbO_2$, SnO more favorably react with oxygen relative to cerium oxide while $V_2O_3$, MnO, FeO, $Cu_2O$, $MoO_2$, $Sb_2O_3$, are expected to react less favorably to oxygen relative to cerium oxide. Any of the oxygen scavenging oxide, or a combination thereof, can be used with the cathode active materials of the present disclosure including blends of LMP and OLO. In certain aspects, the cathode active material including oxygen and the oxygen scavenging oxide are in a weight ratio of from about 99.9:0.1 to about 95:5.

As described above, certain implementations of the present disclosure include a blend of cathode active materials that include oxygen. Such blends include, for example, a lithium metal phosphate and an over-lithiated oxide.

In certain implementations, the LMP can include, without limitation, lithium iron phosphate, lithium manganese phosphate, lithium iron-manganese phosphate, or any combination of such materials. For example, the LMP material can include a cathode active material of $LiFe_{1-x}M_xPO_4$, where $0 \le x \le 1$, and M comprises one or more of manganese (Mn), nickel (Ni), Aluminum (Al), cobalt (Co), magnesium (Mg), zinc (Zn), or titanium (Ti), etc. In certain aspects, x is 0 and the LMP is M is an olivine lithium iron phosphate (LiFePO$_4$).

In other implementations, a cathode active composite or blend of cathode active materials can include, without limitation an over-lithiated oxide (OLO). As used herein, an OLO, also referred to as lithium-rich oxides, are lithium metal oxides that have an excess stoichiometric mole amount of lithium, i.e., have more than one molar equivalent of lithium relative to the amount of transition metal. These materials can be characterized as having extra lithium ions partially substituted for the metal, e.g., the transition metal, of the metal oxide structure.

In some aspects, the OLO can have a formula of $Li_{1+y}M_{1-y}O_2$, wherein 0<y<1 and M is Ni, Mn, Co, Al, Mg, Cr, Fe, Ti, Zr, Mo, or a combination thereof. Further, the value for y can range as 0<y≤0.5 such as 0<y≤0.4. In other aspects, the OLO can be cobalt-free, that is, the amount of cobalt is no more than at an impurity level of the OLO. Depending on the metal mining geographic location, few mole % of cobalt metal may be naturally embedded as an impurity in the nickel metal. Alternatively, the OLO can be substantially free of cobalt, e.g., the OLO has less than 5 mole % of cobalt. Additionally, the OLO can further independently include a high molar amount of Ni and/or Mn such as from about 30-90 mol % Ni and/or from about 70-10 mole % Mn and/or more than about 55 mole % Mn.

As described above, a cathode active composite can include, without limitation, a blend of LMP and OLO. Such blends advantageously can have an increased press density relative to the LMP alone and thus improve energy density of a battery cell including such a cathode active composite. The blend of LMP and OLO can have about 70 to about 99 weight % of LMP and from about 30 to about 1 wt % OLO such as a ratio a ratio of from about 70:30 to about 99:1. In some aspects, an average particle size of the LMP is less than an average particle size of the OLO.

As provided in the Examples below, such LMP/OLO blends have higher gravimetric and volumetric energy density than using LMP alone. Further an oxygen scavenger oxide can also be included with the blend to reduce oxygen evolution of the over-lithiated oxide. Such an oxygen scavenging oxide can be included in a weight ratio of the cathode active material (e.g., blend) to oxygen scavenging oxide of from about 99.9:0.1 to about 95:5. That is, the oxygen scavenging oxide is in an amount that range from about 0.1 wt % to about 5 wt % of the total weight of the active materials and the oxygen scavenging oxide.

Figure 3A:
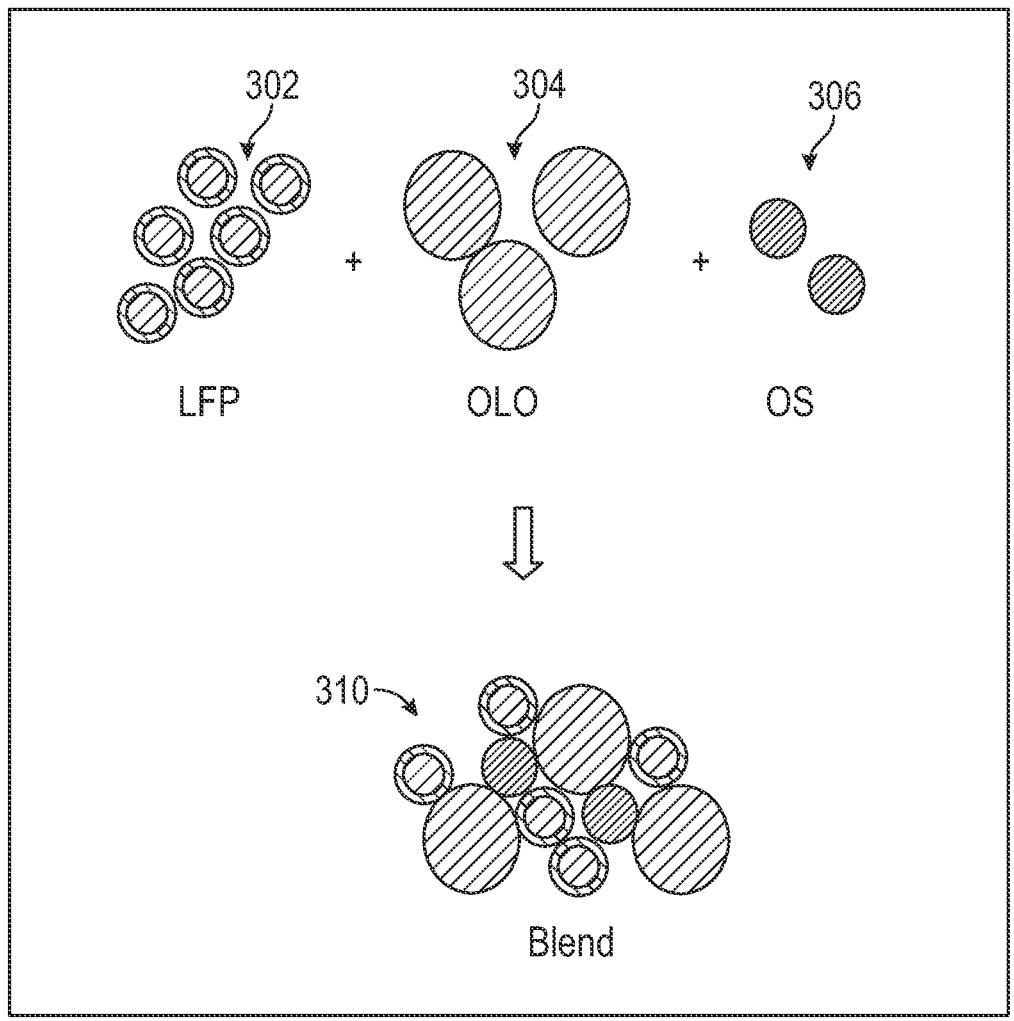
FIGS. 3A, 3B and 3C illustrate a blend of cathode active materials with oxygen scavenger oxide in accordance with one or more implementations.
Figure 3B:
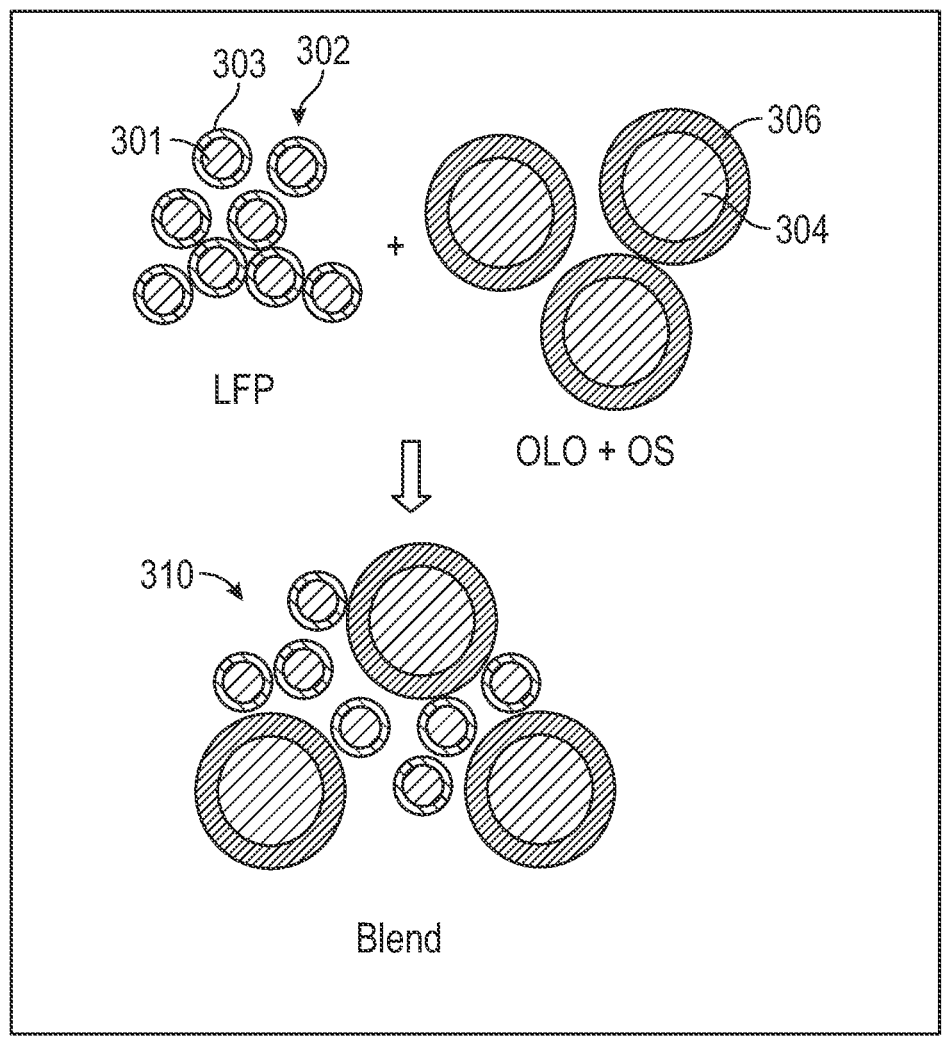
Figure 3C:
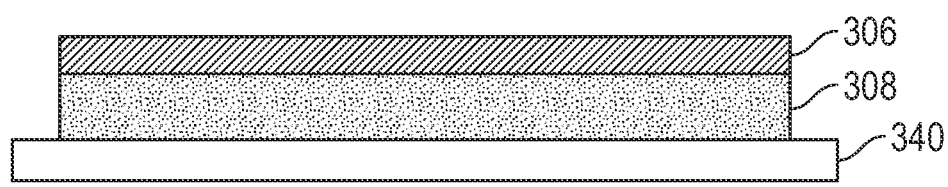

FIGS. 3A, 3B and 3C illustrate various arrangements of cathode active composites formed from a blend of cathode active materials with oxygen scavenger oxide in accordance with one or more implementations. In particular, FIG. 3A illustrates combining initially three separate particles composed of LMP particles (302), OLO particles (304) and oxygen scavenger oxide particles (306) to form an active composite of LMP/OLO/oxygen scavenger oxide (310). FIG. 3B illustrates an alternative active composite in which oxygen scavenger oxide is on at least a portion of an outer surface of OLO particles. In this example, oxygen scavenger oxide (OS) (306) forms a coating layer on the OLO particle (304) such as core/shell structure as illustrated in the FIG. 3B. In addition, the LMP can have or be combined with an electrically conductive carbon. In this example, LMP particles (301) have a carbon coating (303). Further, the carbon coated LMP particles and OLO particles with oxygen scavenging oxide can be combined to form a LMP/OLO/oxygen scavenger oxide (310). The particles of FIG. 3B can be use as an alternative to the particles of FIG. 3a or the particles of FIGS. 3A and 3B can be combined to form cathode active composites.

In some implementations, the oxygen scavenger oxide can be in the form of a layer on a cathode active materials such as a layer on a blend of LMP/OLO. FIG. 3C illustrates another arrangement of a cathode composite. In this example, a layer of oxygen scavenger oxide (306) is on a blend of LMP/OLO (308) which in turn is on a current collector (340). The LMP/OLO blend can be formed from particles of LMP and OLO as in either or both of FIGS. 3A and 3B.

In addition, the LMP/OLO blends can be pressed to have a density that is greater than the press density of LMP alone. To further improve the press density of LMP/OLO blends, the OLO can be composed of particles that are on average larger than particles that compose LMP. Table 2 below provides example particle sizes for LMP and OLO particles and other characteristics of example LMP and OLO that can be used as cathode active composites and blends thereof in aspects of the present disclosure.

TABLE 2

| Materials | LMP | OLO |
|---|---|---|
| Particle size diameter D10 (μm) | 0.1-2.5 | 1-7 |
| Particle size diameter D50 (μm) | 0.7-11.0 | 3-14 |
| Particle size diameter D90 (μm) | 3.7-29.5 | 10-25 |
| Tap Density (g/cm$^3$) | 0.8-1.3 | 0.8-1.4 |
| Pellet Density (g/cm$^3$) | 2.0-2.3 | 2.7-3.2 |
| Specific Surface Area (m$^2$/g) | 8-35 | 1-6 |

Particle Size Diameter: As used herein, "D50" refers to the median particle size measured from the particle size analyzer (PSA), or the particle size (diameter) at 50% in a cumulative distribution. Since primary particle tends to aggregate to each other, especially in nanosized powders, the PSA measurement value (e.g., D10, D50, D90, D100) does not always represent the size of single-crystal particle. Further, as used here, "D10" refers to the particle size (diameter) at 10% in a cumulative distribution, and "D90" refers to the particle size (diameter) at 90% in a cumulative distribution.

Cathode active blends of LMP and OLO advantageously can have higher active mass density than the active mass density of a cathode using the LMP used alone. For example, a blend of the present disclosure can be pressed to increase its active mass density according to the applied pressure when forming an electrode including the blend. The active mass density of the electrode can be about 2.1 g/cc or greater. For example, the active mass density of the electrode can be about 2.1 to about 2.9 g/cc depending on the composition of the blend, the ratio of the components of the blend and the applied pressure. In contrast, however, an active mass density of a positive electrode formed using only the lithium metal phosphate olivine active material is significantly less. Hence, by combining LFP with an OLO, the active mass density of a positive electrode can be increased thereby increasing the capacity of an electrochemical cell including a blend of LFP with OLO relative to a cell with LFP alone. Further, and as shown in the Examples below, an LMP/OLO blend can have a higher specific energy relative to LFP alone such as a 10% higher, 20% higher and over 30% higher specific energy relative to LFP alone. Moreover, an LMP/OLO blend can have a higher specific capacity relative to LFP alone such as a specific capacity of at least 160 mAh/g, e.g., 170 mAh/g or higher.

The cathode active composites and blends of the present disclosure can further include additives to improve one or more of electrochemical performance, reliability, improve fabrication into an electrode, etc. of the active materials. For example, the active materials may be combined with an electrically conductive carbon. Such conductive carbon can include carbon atoms being $sp^2$ hybridized, $sp^3$ hybridized, or combinations thereof. The ratio between $sp^2$ and $sp^3$ type carbons may be determined by preparation methods including choice of carbon precursor materials, heat treatment conditions, etc. Illustrative conductive carbon materials include, without limitation: graphite, a graphene based conductive carbon, carbon black, Super P carbon black material, Ketjen Black, Acetylene Black, carbon nanotubes, such as single-wall carbon nanotubes (SWCNT), multi-wall carbon nanotubes (MWCNT), carbon nanofiber, graphene, or two or more combinations thereof.

In some aspects, the active materials of the present disclosure can have a conductive carbon content, based on the total weight of the active material and carbon, of 1.0-3.5 wt. % and any value thereof and therebetween. Illustrative carbon contents include, for example, a carbon content less than or equal to 3.5, 3, 2.5, or 2 wt. % and greater than or equal to 1.0, 1.5, 2, 2.5, or 3 wt. %. The conductive carbon may be on a surface of the active materials of the present disclosure such as on a surface of LMP particles such as illustrated in FIG. 3B.

The cathode active composites and blends disclosed herein can be prepared by a solid-state or solution based approach. In a solid-state based approached the lithium metal oxide and/or lithium metal phosphate can be commercially sourced and the oxygen scavenging oxide can also be commercially sourced and mixed or blended together to form the composite. In a solution based approached, OLO particles can be coated with an oxygen scavenging oxide or precursor thereof, followed by the heat treatment (400 to 800° C.) in reducing condition using $N_2$, Ar, or $H_2$ gas, or in combination thereof. Reduced oxides, where the metal transition state is not at its maximum number, e.g., $B_6O$, TiO, NbO, $Cu_2O$, etc., may be more suitable for reducing condition heat treatment. For example, Ti can have an oxidation state of 4+, when present as $TiO_2$. An oxygen scavenger TiO, is typically embedded as the matrix form in $TiO_x$, which will require reducing heat treatment to achieve the oxidation state less than 3+. On the other hand, other oxygen scavenger candidate precursors may be prepared together with OLO cathode active materials, which may be more suitable to use in an air/$O_2$ gas environment. Alternatively, or in addition, lithium metal oxide and/or lithium metal phosphate can be prepared via a solid state approach or via solution based approach by combining a lithium source, a phosphorus source and a metal source. The source components and solvent may be distinct compounds, or alternatively, or in combination, they may be a single compound that functions as a source of multiple components (e.g., acidic solvent such as $H_3PO_4$ can serve as a phosphorus source). The solution is then mixed at a predetermined pH and for a period of time sufficient to form a precipitate of lithium metal oxide and/or lithium metal phosphate particles or a precursor thereto. The precipitate is collected and then subjected to an annealing process to form the lithium metal oxide and/or lithium metal phosphate. Another way to introduce oxygen scavenging oxides of the present disclosure to cathode active materials is to simply combine, e.g., by mixing, oxygen scavengers (typically, in nano-powder form) with cathode active materials to form a more or less homogenous mixture that can be included in a slurry and applied to a cathode current collector.

The active composites of the present disclosure may be included in an electrode for use in a battery cell. Battery cells can also be referred to as an electrochemical cell. Electrodes including active composites of the present disclosure may be fabricated by initially preparing a slurry of the active materials and oxygen scavenging oxide in a liquid medium with optionally other ingredients such as a binder, conductive carbon, such as those illustrated above, etc. The slurries can then be used to coat principal surfaces of current collectors followed by drying.

Useful binders for forming the electrodes include, for example, polyvinylidenefluoride (PVdF), polyvinylpyrrolidone (PVP), styrene-butadiene or styrene-butadiene rubber (SBR), polytetrafluoroethylene (PTFE), carboxymethylcellulose (CMC) or combinations thereof. The current collector can include a metal, such as aluminum, copper, nickel, titanium, stainless steel, or a metal alloy, or a carbonaceous material, or a combination thereof. The current collector material may be in the form of a foil, such as a metal foil and may be coated with a conductive carbon, such as carbon-coated aluminum foil, carbon-coated copper foil, or other carbon-coated foil material.

As provided above, the active composites of the present disclosure may be included in an electrode and implemented in a battery cell. In accordance with aspects of the present disclosure, a battery cell can include an electrode including the active composites disclosed herein, e.g., a cathode, which comprises a blend of an LMP with OLO together with an oxygen scavenging oxide. The blend of LMP to OLO have a ratio of from about 70:30 to about 99:1. The oxygen scavenging oxide can have a weight ratio of from about 99.9:0.1 to about 95:5 relative to the blend. The battery cell can further include a separator and/or electrolyte and an anode, which may be formed in-situ on a current collector, e.g., an anode-free cell. The battery cell can further include a positive and a negative terminal, which may be used to electrically connect a load or charger to the battery cell.

Useful electrolytes can include, without limitation, liquid electrolytes, gel electrolytes, solid electrolytes, etc. Liquid electrolytes can include, without limitations, a salt dissolved in a solvent medium. A wide variety of solvent media may be included with liquid electrolyte of battery cells of the present disclosure such as carbonates, ethers and acetates, for example. In one aspect of the present disclosure, the electrolyte includes one or more carbonate solvents such as dimethyl carbonate (DMC), diethyl carbonate (DEC), and ethyl methyl carbonate (EMC), ethylene carbonate (EC), propylene carbonate (PC), vinylene carbonate (VC), fluoroethylene carbonate (FEC), etc. or mixtures thereof. For lithium ion battery cells, a variety of lithium salts may be added to the electrolyte such as lithium hexafluorophosphate ($LiPF_6$) lithium tetrafluoroborate ($LiBF_4$), lithium perchlorate ($LiClO_4$), lithium hexafluoroarsenate ($LiAsF_6$), lithium triflate ($LiSO_3CF_3$), etc., or mixtures thereof.

Useful separators that may be included in a battery cell of the present disclosure may be composed of, without limitation: a polymer such as polyethylene, polypropylene, polyolefin, and/or polyamide, a ceramic, glass, or other insulating materials, or any combination thereof.

Useful anodes that may be included in a battery cell of the present disclosure may be composed of, without limitation: graphitic carbon (e.g., ordered or disordered carbon with $sp^2$ hybridization, artificial or natural graphite, or blends thereof), lithium metal, lithium alloys such as Li—Mg, Li—Al, Li—Ag alloys, a metal oxide, e.g., lithium titanate, silicon, a silicon-based material (e.g., silicon-based carbon composite, oxide, carbide, a pre-lithiated silicon material), etc. or a combination of any two or more thereof.

In some aspects, anodes that may be included in a battery cell in accordance with the present disclosure include an anode that may be formed in situ on a current collector, e.g., an anode-free cell. For example, an electrode can include a current collector (e.g., a metal foil such as a copper foil or carbon foil) with an in situ-formed anode (e.g., Li metal) on a surface of the current collector facing a separator or solid-state electrolyte. In such examples, a battery cell may be configured to lack an anode active material in an uncharged state.

Cathode electrodes that include an over-lithiated oxide are generally charged at a higher initial voltage to activate the OLO material. For example, a battery cell having a cathode active composite including a blend of LMP and OLO can be activated by charging the cell to a first predetermined voltage. The first predetermined voltage can be ≤4.8V vs. Li/Li$^+$, such as up to about 4.4V, 4.6V, etc. to activate the cell. After activation, such a cell can be operated for a relatively long cycle life by discharging the battery cell and charging the battery cell to a second predetermined voltage which is less than the first predetermined voltage, e.g., ≤4.4 V vs. Li/Li$^+$, such as ≤4.3V.

In accordance with aspects of the subject technology, a method is provided that includes: obtaining a battery having a cell (e.g., a battery cell 120), the cell including a cathode (e.g., cathode 212), an anode (e.g., anode 208), and an electrolyte (e.g., electrolyte 210), and operating the cell after activation by charging the cell of the battery, and/or discharging the cell of the battery in which charging is to an operating voltage (second predetermined voltage) of, ≤4.4 V vs. Li/Li$^+$. Discharging the cell can provide electrical power to a power-consuming component (e.g., a vehicle and/or an electrical system of a building).

EXAMPLES

The following examples are intended to further illustrate certain aspects of the subject technology and are not limiting in nature. Those skilled in the art will recognize, or be able to ascertain, using no more than routine experimentation, numerous equivalents to the specific substances and procedures described herein.

Example 1. Cathode Active Composites

As provided in the Table E1 below, we used commercially available lithium iron phosphate (LFP), lithium (manganese) iron phosphate (LMFP), and the over-lithiated oxide (Ni 30%, Mn 70%). Table 1 below further compares the press density of the various cathode active materials and a blend of LFP and OLO. The blend was prepared by mixing LFP+OLO at a 7:3 w/w ratio and then subjecting the mixture to a pellet dye press with about 2.78 ton pressure. The electrode press density is precisely controlled by a calendaring machine, typically from 2.5 to 3.5 ton. Press density was determined by calculating the volume packed with powders divided from pre-determined powder weight (1 gram of powder).

TABLE E1

Press density of various cathode active materials

| LMFP | LFP | OLO (Ni30%, Mn70%) | LFP + OLO Blend (7:3 w/w) |
|---|---|---|---|
| 1.94 g/cc | 2.36 g/cc | 3.07 g/cc | 2.57 g/cc |

As shown in Table E1 above, the pellet density of a blend of LFP with OLO is higher than the pellet density of LFP alone. The LFP/OLO blend tested in this example yielded a high press density of 2.57 g/cc and higher than the press density of LFP without the OLO.

Example 2. Battery Cells

Coin half cells were made inside a glove box under an inert atmosphere (H$_2$O and O$_2$ level under 0.1 ppm). An Li chip was used as an anode and reference electrode, and LFP/OLO blend electrode was placed as a working electrode. A polypropylene separator was placed between two electrodes, and 40 μL of electrolyte was injected to wet all the electrodes and the separator.

Example 3. Charge and Discharge Analyses

Coin cells prepared according to Example 2 were subjected to charge/discharge cycles. The coin cells with LFP/OLO blends were activated by first charging the cell to a first predetermined activation voltage, which in this case was 4.6V vs. Li/Li$^+$. In the following cycle, cells were charged at various upper cutoff voltages, which in this case was 3.8 V to 4.6 V, followed by discharging to 2.5 V. Table E3 below provides of cathode active materials including a blend of LFP and OLO.

TABLE E3

| | Nominal Voltage | Specific Energy (C/20) | Cutoff Voltage |
|---|---|---|---|
| LFP | 3.37 V | 530 mWh/g | 2.0 V-3.7 V |
| LMFP | 3.91 V | 596 mWh/g | 2.7 V-4.3 V |
| LFP + OLO | 3.52 V | 697 mWh/g | 2.0 V-4.6 V |

As shown in Table E3 above, the LFP/OLO blend resulted in about a 32% increase in specific energy over LFP alone and about a 17% increase in specific energy over LMFP.

Figure 4A:
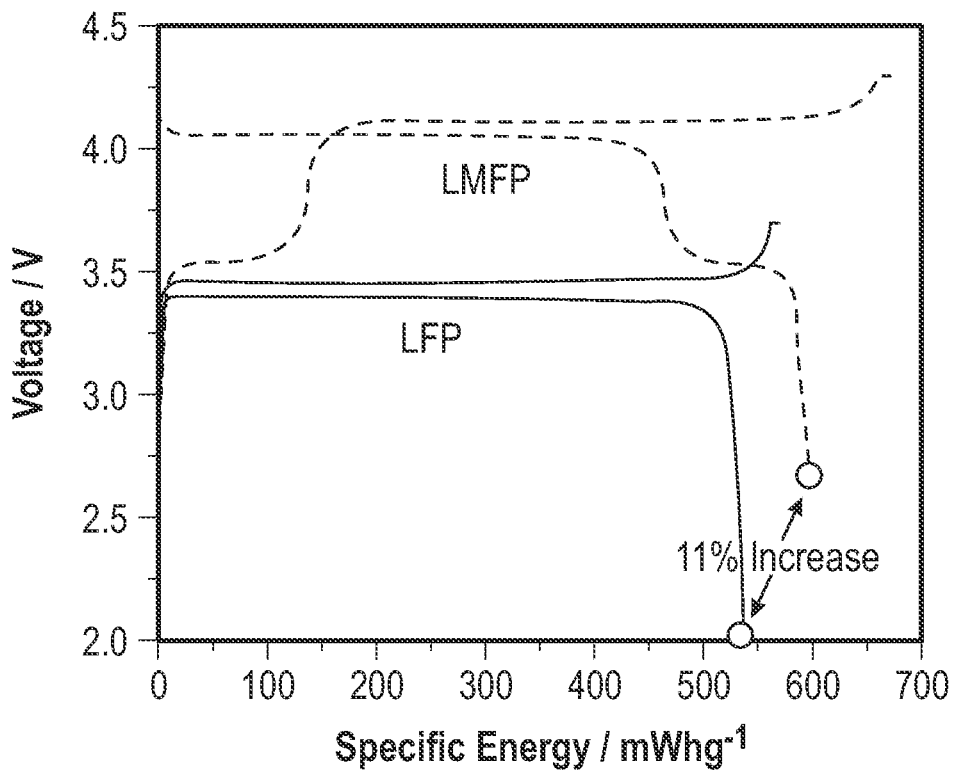
FIGS. 4A and 4B are plots of voltage versus capacity comparing various cathode active materials as set forth in Example 1. In particular.
Figure 4B:
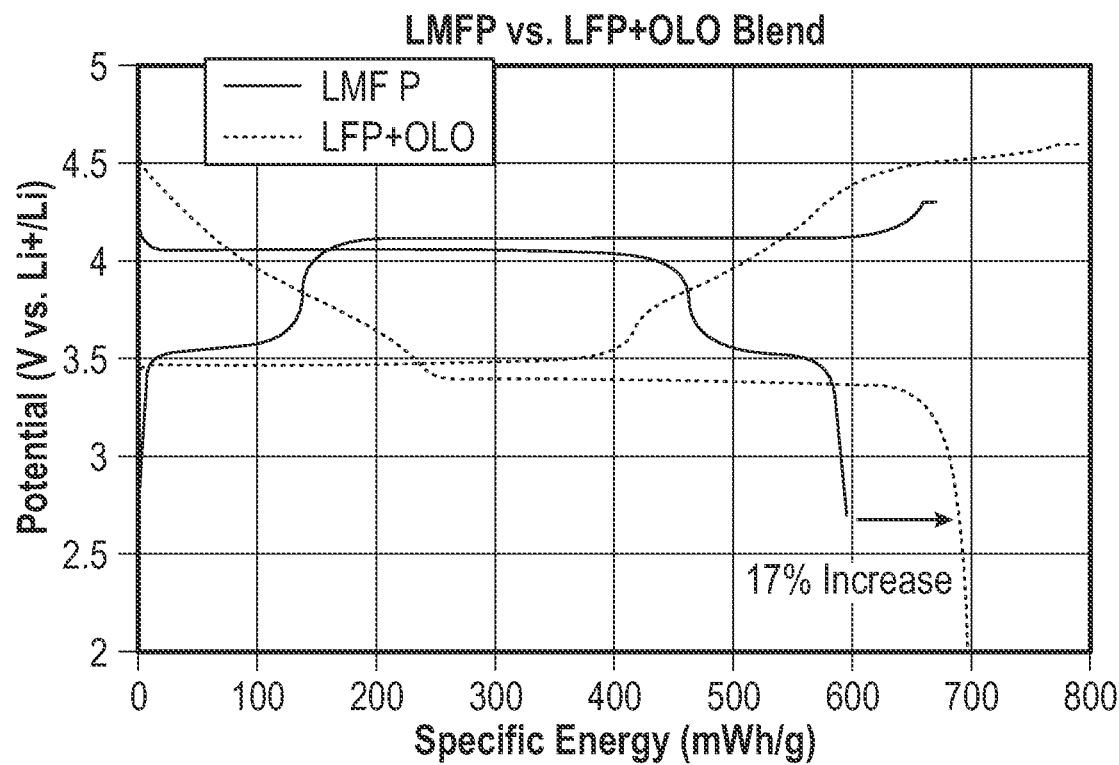

FIGS. 4A and 4B show plots of voltage versus capacity comparing the various cathode active materials as set forth in Example 1 after activation. In particular, FIG. 4A is a graph comparing charge and discharge results for battery cells with cathodes including either lithium iron phosphate (LFP) or lithium (manganese) iron phosphate (LMFP). FIG. 4B is a graph comparing charge and discharge results for battery cells with cathodes including either LMFP or a composite blend of LFP and over-lithiated oxide material prepared according to Example 1. Although the LFP/OLO blend showed lower nominal voltage compared to LMFP, the blend had a higher specific energy compared to LMFP.

Example 3. Effect of Upper Voltage Cut-Off on Discharge Capacity

Figure 5:
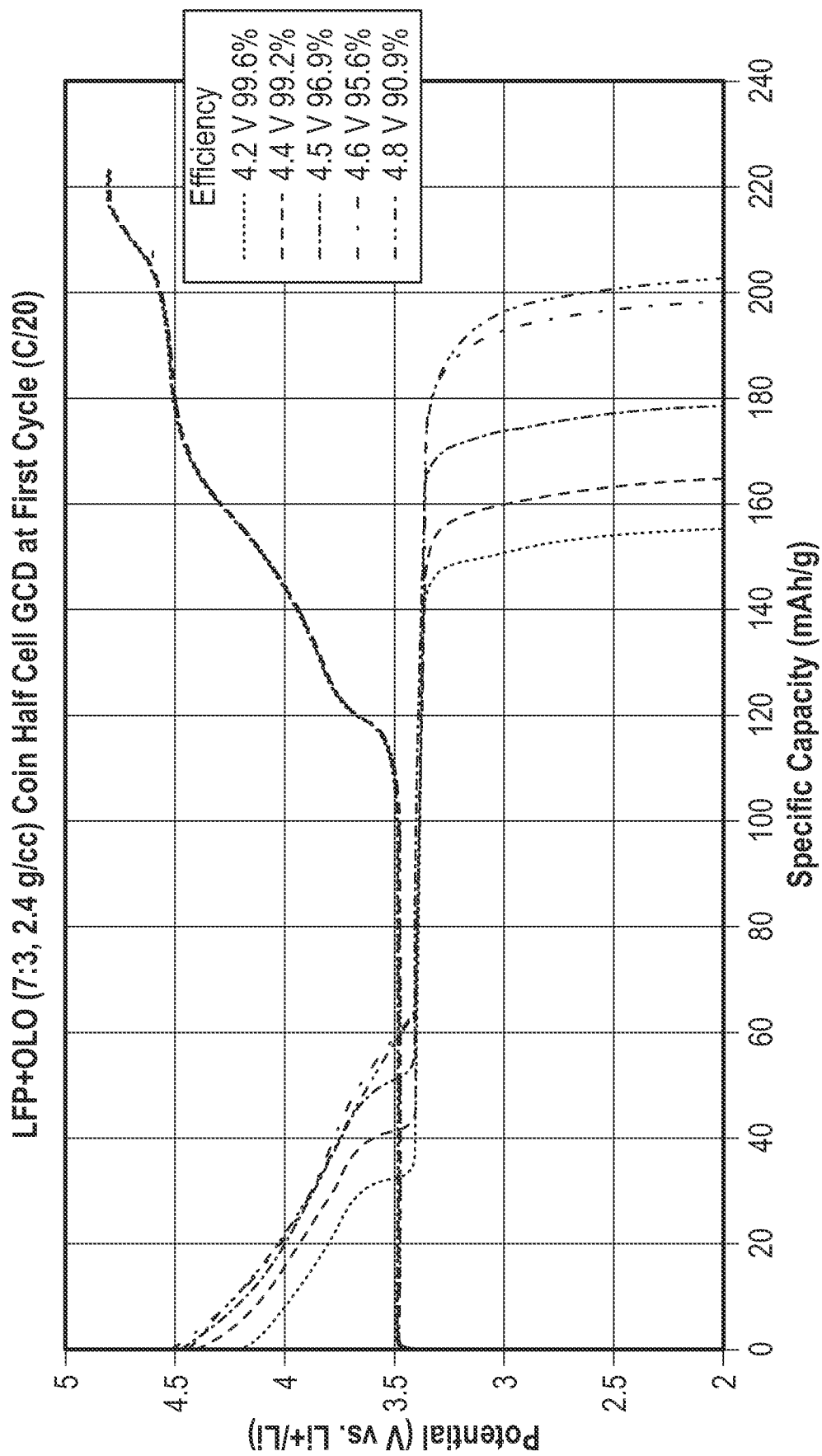
FIG. 5 is graph of galvanostatic (constant current) charging/discharging (GCD) results for coin half cells at first cycle with C/20 with respect to various charge cut-off voltages and showing corresponding specific capacities.

Coin cells prepared according to Example 2 and activated by charging to a first predetermined activation voltage (≤4.8V vs. Li/Li$^+$). FIG. 5 shows the results of galvanostatic (constant current) charging/discharging (GCD) of the coin half cells at first cycle with C/20 with respect to various charge cut-off voltages and showing corresponding specific capacities. As shown in FIG. 5, the coin cells were activated by charging to a first voltage of 4.2V, 4.4V, 4.5V, 4.6V or 4.8V. It is believed that activation of OLO in the cathode LFP/OLO blend involves lithium ion extraction and oxygen evolution and higher cut-off voltages leads to an increase in lower Coulombic efficiency CE, which is expected due to the inherent properties of OLO. Nonetheless, the following discharge capacity easily exceed a theoretical capacity of LFP alone (170 mAh/g) when the blend is activated over 4.5 V vs. $Li/Li^+$. As further shown in FIG. 5, charging to a first predetermined voltage of about 4.6 V vs. $Li/Li^+$ for a cathode having an LFP/OLO blend 7:3 w/w appears advantageous in terms of both CE and discharge capacity.

Figure 6A:
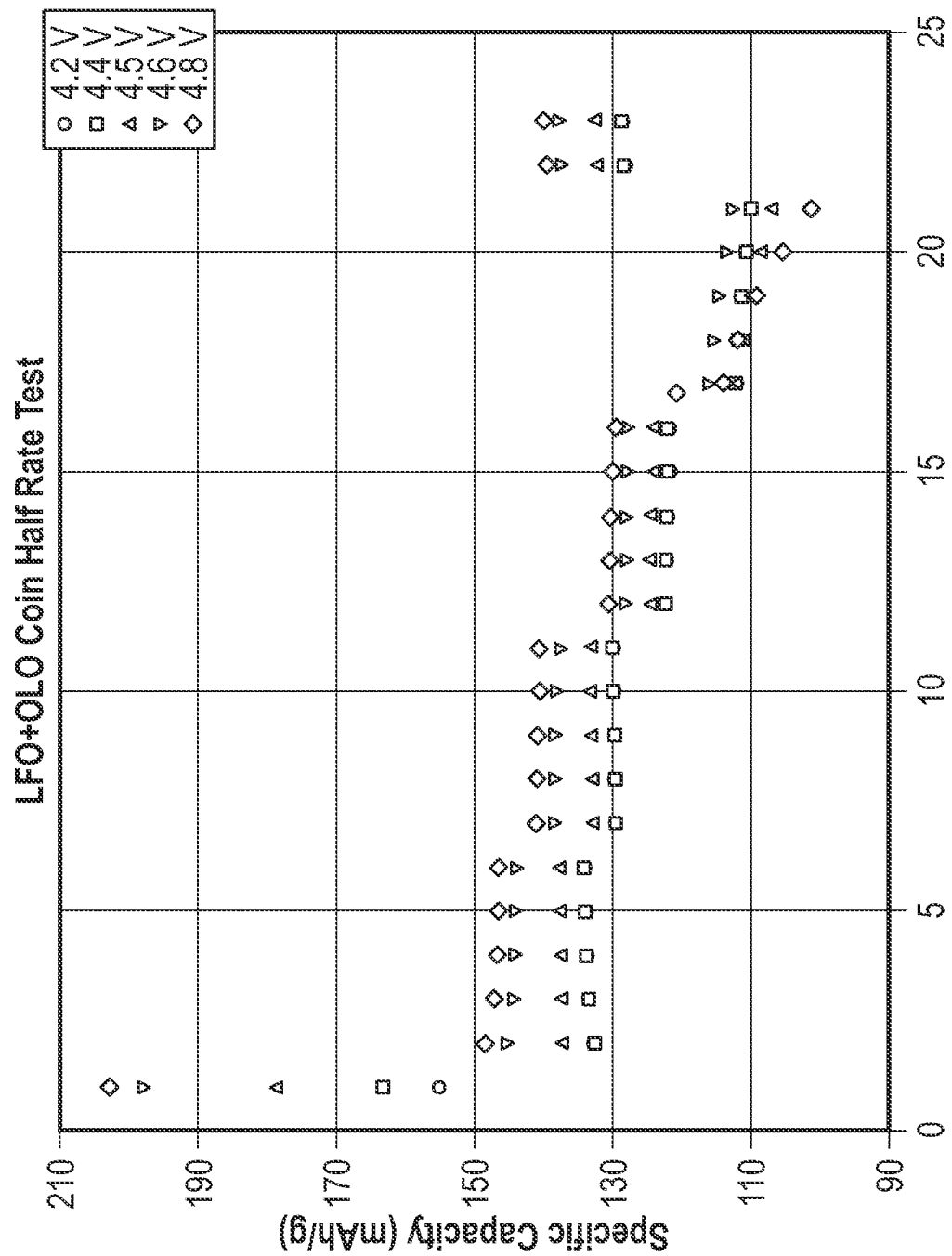
FIGS. 6A and 6B show the results of cycle life of coin cells having cathodes with a blend of LFP/OLO subjected to various activation voltages and discharge/charge cycling.
Figure 6B:
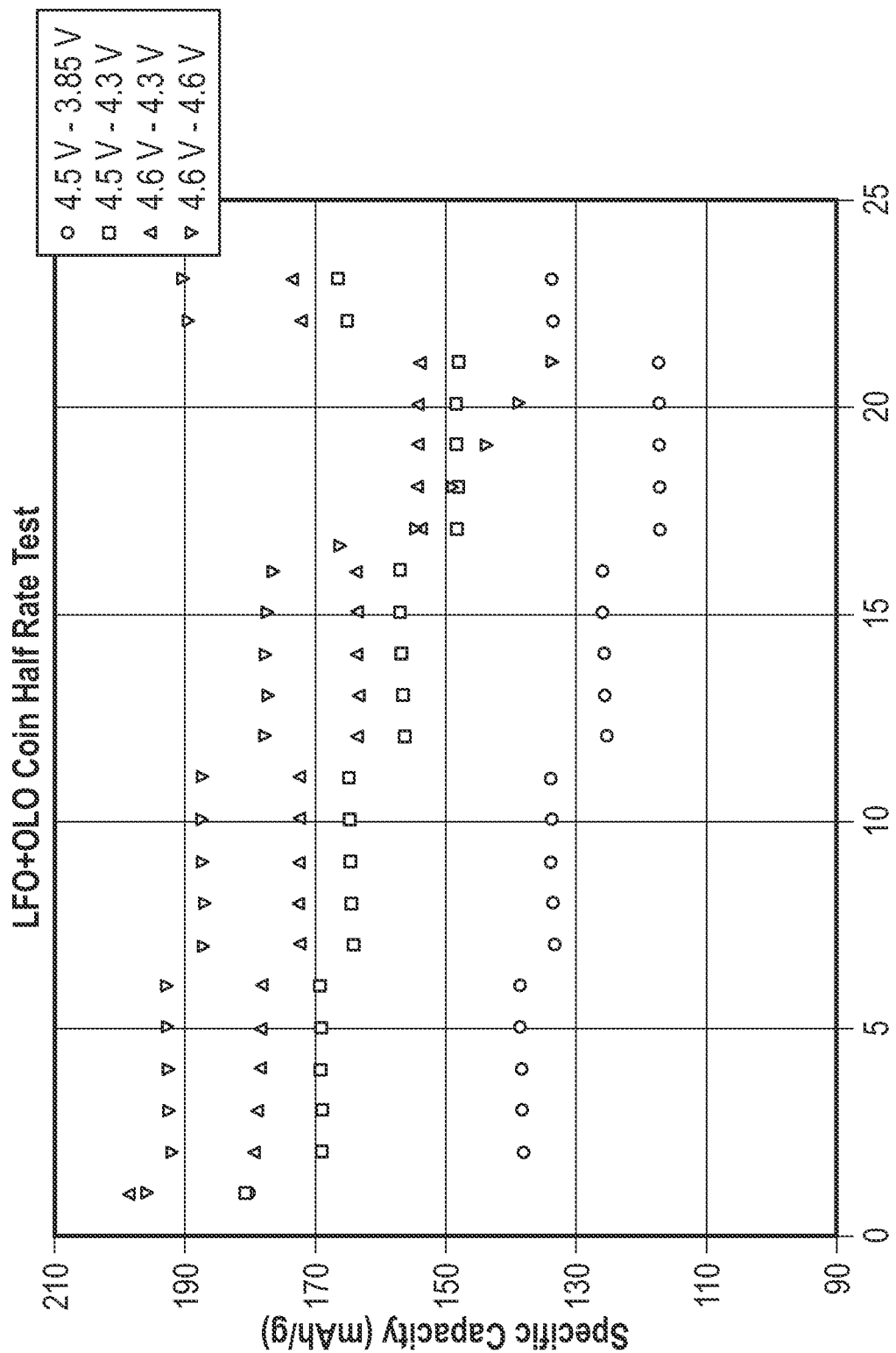

FIGS. 6A and 6B further show the effects of varying the activation voltage cut-off and cycle life at various charge rates (from C/10 to 2 C). In particular, coin cells prepared according to Example 2 were initially activated by charging to one of five predetermined voltage (4.2 V, 4.4V, 4.5V, 4.6V and 4.8V vs. $Li/Li^+$, respectively). The cells were then discharged and charged to a second predetermined voltage (3.85V, 4.3V, 4.6V vs. $Li/Li^+$) with various charging rates of C/10, C/3, 1C and 2 C and specific capacity plotted versus the number of charge/discharge cycles. The results shown in FIGS. 6A and 6B.

Figure 7:
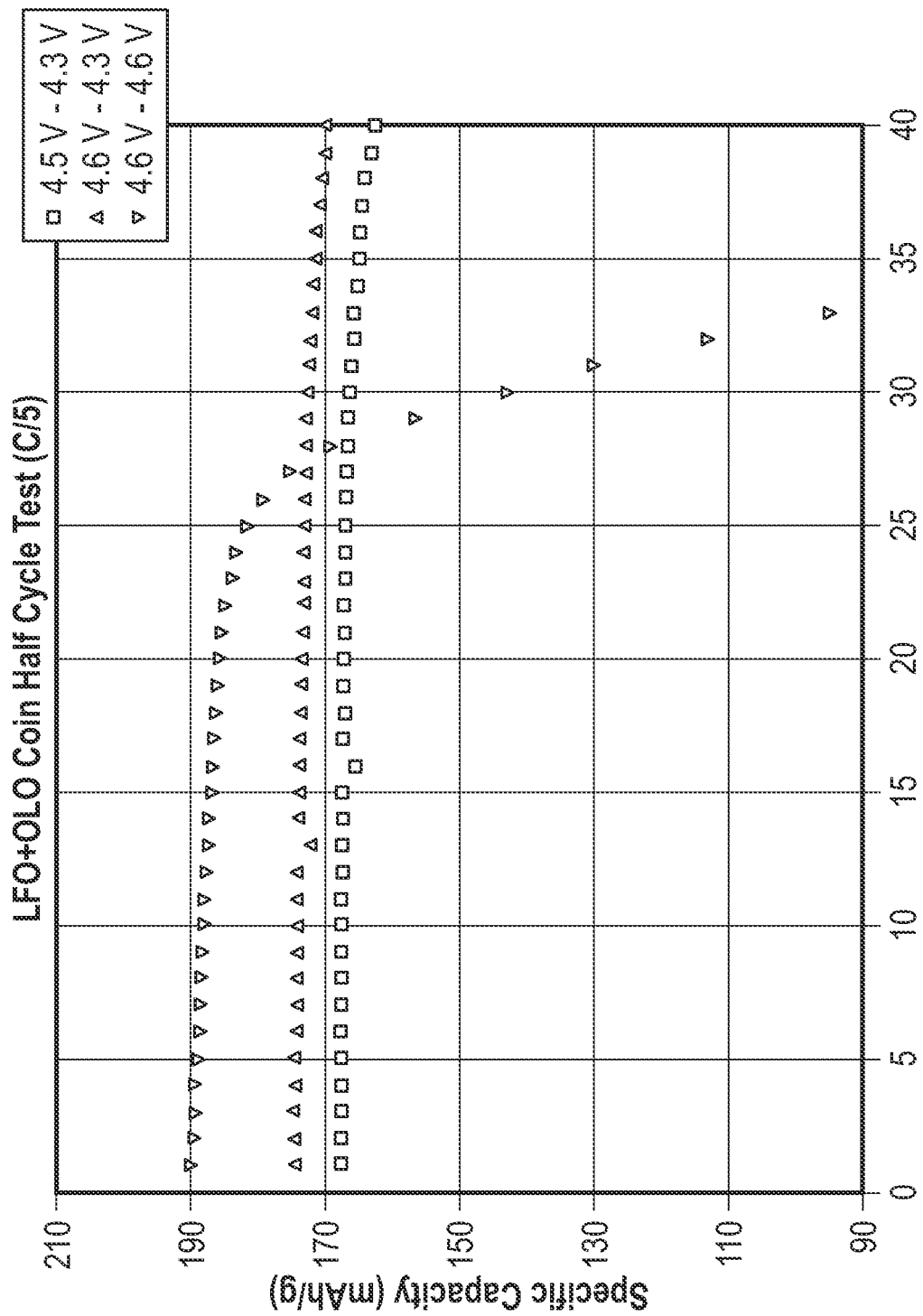
FIG. 7 is a plot showing the effects of varying the upper limit operating voltage on cycle life of coin cells having cathode active composite in accordance with certain implementations of the present disclosure.

FIG. 7 is a plot showing the effects of varying the upper limit operating voltage on cycle life. In particular, coin cells prepared according to Example 2 were initially activated by charging to 4.6V vs. $Li/Li^+$, followed by cycling the cells to an operating voltage (second predetermined voltage) of either 4.3 V or 4.6V vs. $Li/Li^+$. As shown by FIG. 7, activating a cell having a cathode blend of LFP/OLO at a 7:3 w/w ratio then cycling with an operating voltage that does not exceed 4.4 V, e.g., 4.3V, can yield a cell with extended cycle life at a discharge capacity over 170 mAh/g, which is not achievable when LFP does not contribute significant capacity at higher voltage, while electrolyte decomposition may be accelerated.

As illustrated by the data provided in FIGS. 6-7, a battery cell having a cathode active composite including a blend of LMP and OLO can be activated by charging the cell to a first predetermined voltage (≤4.8V vs. $Li/Li^+$). Such a cell can subsequently be operated for a relatively long cycle life by discharging the battery cell and charging the battery cell to a second predetermined voltage (≤4.4 V vs. $Li/Li^+$), which is less than the first predetermined voltage.

Aspects of the subject technology can help improve the operation and implementation of battery cells. For example, battery cells having electrode active composites of the present disclosure can increase energy density and utilization of batteries. Batteries with increased energy density can help to mitigate climate change by reducing and/or preventing additional greenhouse gas emissions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, the term "coupled" or the like may refer to being directly coupled. In another aspect, the term "coupled" or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

What is claimed is:

1. A cathode active composite, comprising
a blend of a lithium metal phosphate (LMP);
an over-lithiated oxide (OLO), which includes an excess stoichiometric mole amount of lithium in a lithium metal oxide; and
an oxygen scavenging oxide selected among: $Ce_2O_3$, $B_6O$, TiO, NbO, $NbO_2$, SnO, $V_2O_3$, MnO, FeO, $Cu_2O$, $MoO_2$, $Sb_2O_3$, or a combination thereof;
wherein the blend of LMP to OLO are in a ratio of from about 70:30 to about 99:1 and wherein an average particle size of the LMP is less than an average particle size of the OLO.

2. The cathode active composite of claim 1, wherein the OLO has a formula of $Li_{1+y}M_{1-y}O_2$, wherein $0<y<1$ and M is Ni, Mn, Co, Al, Mg, Cr, Fe, Ti, Zr, Mo, or a combination thereof.

3. The cathode active composite of claim 1, wherein the OLO has less than 5 mole % of cobalt.

4. The cathode active composite of claim 1, wherein the OLO has less than 5 mole % of cobalt and more than 55 mole % Mn.

5. The cathode active composite of claim 1, wherein the OLO has from about 30-90 mol % Ni and from about 70-10 mol % Mn.

6. The cathode active composite of claim 1, wherein the LMP comprises $LiFe_{1-x}M_xPO_4$, wherein $0 \leq x \leq 1$ and M comprises manganese (Mn), nickel (Ni), Aluminum (Al), cobalt (Co), magnesium (Mg), zinc (Zn), titanium (Ti), or a combination of two or more thereof.

7. The cathode active composite of claim 1, wherein the oxygen scavenging oxide forms a coating layer on OLO particles.

8. The cathode active composite of claim 1, wherein the oxygen scavenging oxide forms an oxygen scavenging oxide layer on a blend of the LMP and OLO.

9. A cathode, comprising:
a current collector having the cathode active composite of claim 1.

10. A battery cell, comprising:
a cathode comprising the cathode active composite of claim 1.

11. The battery cell of claim 10, further comprising an anode which comprises lithium metal, a lithium metal alloy, a metal oxide, silicon, a silicon-based material, a a carbonaceous material, or a combination thereof.

12. The battery cell of claim 10, wherein the LPM comprises $LiFeO_4$; wherein the OLO has a formula of $Li_{1+y}M_{1-y}O_2$, wherein $0<y<1$ and M is Ni, Mn, Co, Al, Mg, Cr, Fe, Ti, Zr, Mo, or a combination thereof.

13. A vehicle comprising the battery cell of claim 10.

* * * * *

UNITED STATES PATENT AND TRADEMARK OFFICE
CERTIFICATE OF CORRECTION

PATENT NO. : 12,027,703 B1
APPLICATION NO. : 18/447255
DATED : July 2, 2024
INVENTOR(S) : Woochul Shin et al.

Page 1 of 1

It is certified that error appears in the above-identified patent and that said Letters Patent is hereby corrected as shown below:

In the Claims

Column 22, Lines 45-46 (Claim 11): "material, a a carbonaceous" should read --material, a carbonaceous--;

Column 22, Lines 47-48 (Claim 12): "the LPM comprises $LiFeO_4$;" should read --the LMP comprises $LiFePO_4$;--.

Signed and Sealed this
Twenty-seventh Day of August, 2024

Katherine Kelly Vidal
*Director of the United States Patent and Trademark Office*